(12) United States Patent
Chen

(10) Patent No.: US 12,723,849 B2
(45) Date of Patent: Sep. 1, 2026

(54) SHOOTING COLOR-CHANGING TARGET PAPER AND MANUFACTURING PROCESS THEREOF

(71) Applicant: Guangzhou Target House Trading Co., Ltd, Guangzhou (CN)

(72) Inventor: Linxiang Chen, Guangzhou (CN)

(73) Assignee: GuangZhou Target House Trading Co., Ltd, Guangzhou (CN)

( * ) Notice: Subject to any disclaimer, the term of this patent is extended or adjusted under 35 U.S.C. 154(b) by 303 days.

(21) Appl. No.: 18/473,588

(22) Filed: Sep. 25, 2023

(65) Prior Publication Data

US 2024/0011747 A1 Jan. 11, 2024

(51) Int. Cl.

| | |
|---|---|
| ***B32B 37/20*** | (2006.01) |
| ***B32B 27/10*** | (2006.01) |

(Continued)

(52) U.S. Cl.

CPC ................ *F41J 5/24* (2013.01); *B32B 27/10* (2013.01); *B32B 27/32* (2013.01); *B32B 29/06* (2013.01); *B32B 37/12* (2013.01); *B32B 37/203* (2013.01); *B41M 5/0064* (2013.01); *B41M 7/0081* (2013.01); *B32B 2255/10* (2013.01);

(Continued)

(58) Field of Classification Search

CPC ........... B32B 7/12; B32B 27/10; B32B 27/32; B32B 29/06; B32B 37/12; B32B 37/203; B32B 2255/10; B32B 2307/4023; B32B 2307/518; B32B 2317/12; B32B 2323/10; B32B 2554/00; B41J 11/00214; B41M 5/0064; B41M 7/0081; B41M 2205/12; F41J 5/24

See application file for complete search history.

(56) References Cited

U.S. PATENT DOCUMENTS 5,580,063 A * 12/1996 Edwards .................... F41J 1/01 273/408
9,170,077 B2 * 10/2015 Johnson .................... F41J 5/24

(Continued)

FOREIGN PATENT DOCUMENTS

| | | |
|---|---|---|
| CN | 105135950 A | 12/2015 |
| CN | 109948630 A | 6/2019 |
| CN | 213515285 U | 6/2021 |

*Primary Examiner* — Gerard Higgins

(74) *Attorney, Agent, or Firm* — JEEN IP LAW, LLC

(57) ABSTRACT

The present disclosure provides a shooting color-changing target paper and a manufacturing process thereof, comprising a substrate paper layer, a BOPP optical film layer which is provided above the substrate paper layer and a UV-printing ink layer which is provided above the BOPP optical film layer. The manufacturing process comprises: S1: preparing a substrate; S2: attaching a BOPP optical film; S3: placing the substrate on a printing device; S4: printing a target paper pattern; S5: curing with a UV lamp; and S6: packaging a finished product. According to the present disclosure, the BOPP optical film layer is attached to the substrate paper and then the target paper pattern is printed on the optical film through UV without repeated printing. By drying and curing the ink through the UV lamp, the produced target paper may be immediately packaged for use without ventilation and drying, resulting in a higher production efficiency.

4 Claims, 4 Drawing Sheets

(51) Int. Cl.
*B32B 27/32* (2006.01)
*B32B 29/06* (2006.01)
*B32B 37/12* (2006.01)
*B41M 5/00* (2006.01)
*B41M 7/00* (2006.01)
*F41J 5/24* (2006.01)

(52) U.S. Cl.
CPC . *B32B 2307/4023* (2013.01); *B32B 2307/518* (2013.01); *B32B 2317/12* (2013.01); *B32B 2323/10* (2013.01); *B32B 2554/00* (2013.01); *B41M 2205/12* (2013.01)

(56) References Cited

U.S. PATENT DOCUMENTS

2016/0327377 A1* 11/2016 Flynn ......................... F41J 1/00
2021/0094317 A1* 4/2021 Knittle ..................... B41J 15/04
2022/0410584 A1* 12/2022 Sato ..................... B41J 11/0021

* cited by examiner

S1 Prepare a substrate: dye and print the paper into a dyed paper with a striking color for subsequent use

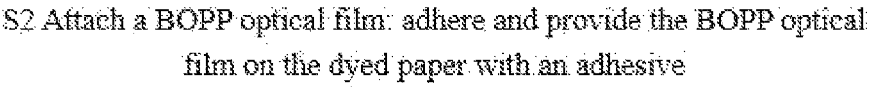

S3 Place the substrate on a printing device: wind and place the two ends of the substrate with the BOPP optical film prepared in step S2 on a winding assembly of the printing device, such that the substrate-dyed paper is located on a lower side of the printing assembly of the printing device S4 Print the target paper pattern: start the printing assembly and the winding assembly of the printing device, such that the substrate-dyed paper moves from an unwinding end to a winding end of the winding assembly; print a UV-printing ink layer by the printing assembly using a UV special-purpose ink on the BOPP optical film layer; and set the printing pattern of the UV-printing ink layer according to the design and use requirements S5 Cure with a UV lamp: turn on the UV ultraviolet lamp on the printing device; dry and cure the target paper pattern by the UV ultraviolet lamp; and wind up the finished product of the printed target paper by a winding section of the winding assembly S6 Package the finished product: cut the target paper roll cured in step S5 into a desired size and shape, and then package and warehouse the same

FIG. 3

SHOOTING COLOR-CHANGING TARGET PAPER AND MANUFACTURING PROCESS THEREOF

TECHNICAL FIELD

The present disclosure relates to the field of shooting target paper, in particular to a shooting color-changing target paper and a manufacturing process thereof.

BACKGROUND

A target paper is typically used for a bullet or other shooting tools for recreational or training purposes. Conventional target paper production techniques are generally described in U.S. Pat. No. 7,631,877, by painting or printing bright or visibly colored patterns on the surface of the paper or other medium to make it easier for the shooter to see if his or her shot hits. A disadvantage of conventional target paper production techniques is that a bullet or other object hitting the target paper causes a large piece of coating or paper to break down and fall off, and thus the shooter cannot see the location of the hit at all.

Prior art techniques for printing a target paper on top of a composite laminate coating have improved the deficiencies of conventional target paper production techniques, allowing the shooter to find the location of the hit more accurately. However, the process of this production technique is tedious, and it is necessary to coat the support, then print the target paper pattern, and then coat the film, and then stack the coating layers with different colors to form the final target paper, and bond them together by applying heat and pressure using an adhesive (U.S. Pat. No. 9,857,150 B1). Because of a plurality of coating processes, the product is heavy and slimy and needs to be air dried before packaging.

There is a need for anew type of shooting target paper with simpler production process and better application effect, which can solve the above problems.

SUMMARY

The present disclosure provides a shooting color-changing target paper and a manufacturing process thereof, and solves the problems of complex production process and low production efficiency of existing shooting target paper through the technical transformation of the existing manufacturing process of the shooting target paper.

In order to achieve the above-mentioned purpose, the technical solution adopted by the present disclosure is:

a shooting color-changing target paper comprising a substrate paper layer, a BOPP optical film layer and a UV-printing ink layer, wherein the BOPP optical film layer is provided above the substrate paper layer and the UV-printing ink layer is provided above the BOPP optical film layer. The UV-printing ink layer is provided with a central scoring area, an outer scoring area and a peripheral marking area which are provided with a background color and a contour shape according to use requirements.

Preferably, the substrate paper layer is a dyed paper with a striking color, and the background color and pattern of the dyed paper are selectively set according to the use requirements.

A process for producing a shooting color-changing target paper, comprising the following steps:

S1: prepare a substrate as follows: dye and print the paper into a dyed paper with a striking color for subsequent use;

S2: attach a BOPP optical film as follows: adhere and provide the BOPP optical film on the dyed paper with an adhesive;

S3: place the substrate on a printing device as follows: wind and place the two ends of the substrate with the BOPP optical film prepared in step S2 on a winding assembly of the printing device, such that the substrate-dyed paper is located on a lower side of the printing assembly of the printing device;

S4: print the target paper pattern as follows: start the printing assembly and the winding assembly of the printing device, such that the substrate-dyed paper moves from an unwinding end to a winding end of the winding assembly; print a UV-printing ink layer by the printing assembly using a UV special-purpose ink on the BOPP optical film layer; and set the printing pattern of the UV-printing ink layer according to the design and use requirements;

S5: cure with a UV lamp as follows: turn on the UV ultraviolet lamp on the printing device; dry and cure the target paper pattern by the UV ultraviolet lamp; and wind up the finished product of the printed target paper by a winding section of the winding assembly; and S6: package the finished product as follows: cut the target paper roll cured in step S5 into a desired size and shape, and then package and warehouse the same.

Preferably, step S2 comprises:

step S201: unwinding and stretching the substrate-dyed paper to a desired size;

step S202: adhering the BOPP optical film to a surface of the substrate-dyed paper using a suitable glue or adhesive; and ensuring uniform bonding and avoiding bubbles and wrinkles;

step S203: subjecting the bonded material to heat and pressure treatment to ensure that the BOPP optical film is firmly bonded to the substrate-dyed paper and is flat.

Preferably, in step S3, a step S301 of a corona process is further comprised, wherein a corona device is provided at the printing device near the unwinding end of the winding assembly, and the substrate paper layer to be printed is subjected to electric shock treatment by the corona device.

Preferably, in step S4, the printing assembly comprises a plurality of printing units containing UV special-purpose inks of different colors, which are sequentially provided on a moving path of the target paper in sequence. The master control system is provided with central scoring area, outer scoring area and peripheral marking area graphics of different colors according to the use requirements, and the graphics of corresponding colors are sequentially printed on the corresponding areas of the target paper using the UV special-purpose inks by the printing units.

Preferably, in step S5, a UV ultraviolet lamp is provided at the rear of each printing unit, and after each printing, the target paper patterns of successively printed colors are dried and cured by the UV ultraviolet lamp to ensure that the colors are not mixed.

Preferably, in step S5, a step S501 of a counting process is further comprised, wherein the printing device is provided with a visual detection device near the winding end of the winding assembly, and the finished product is detected and counted by the visual detection device to ensure that the ink patterns of various colors relate to each other to form a complete target paper pattern of different colors.

The advantageous effect of the present disclosure lies in that:

The present disclosure provides a shooting color-changing target paper from which the shooting and color-changing effects are obtained when a bullet hits the target paper pattern and rubs off the UV ink to expose the bottom color of the substrate (writing paper or dyed paper). The pattern and color of the target paper, as well as the background color of the dyed paper, are set according to the design needs, overcoming the deficiencies of the common target paper, such that the shooting training activities are more intuitive and interesting.

The product produced according to the present disclosure is printed once without repeated multi-layer printing and multi-layer coating for bonding. The present application uses a UV lamp to dry and cure a special ink. This process may ensure that the ink is cured and attached to the BOPP light film, such that the ink has higher durability and the produced target paper may be immediately packaged and used without ventilation and drying. The production process of the present disclosure is simpler and more efficient than existing production processes for printing target paper.

BRIEF DESCRIPTION OF DRAWINGS

FIG. 3 is a diagram of the steps of the production process according to the present disclosure;

Figure 1:
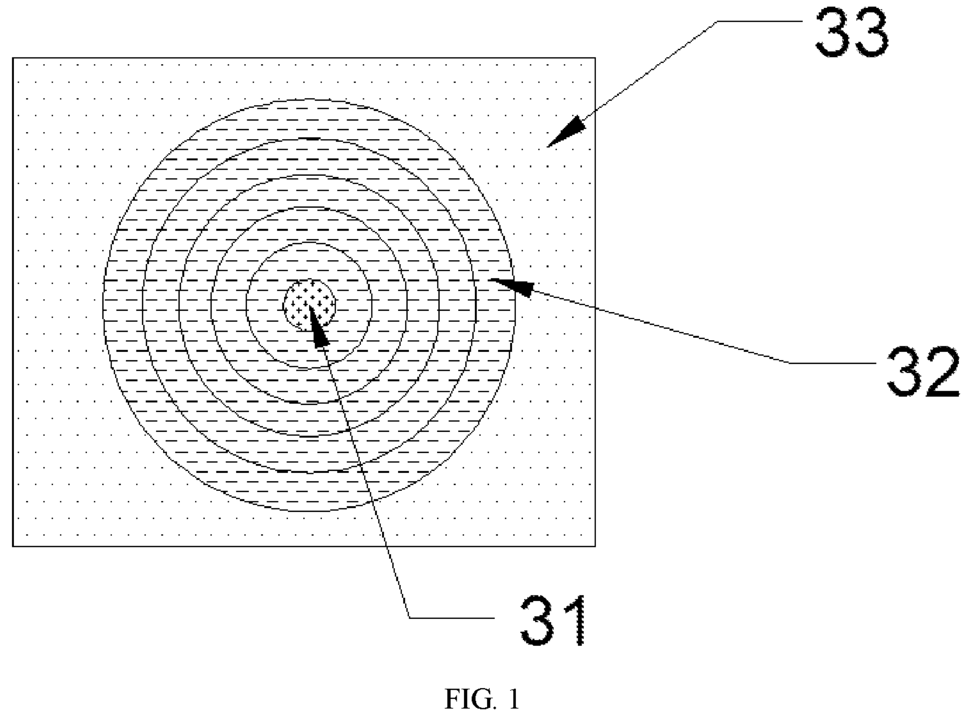
FIG. 1 is a hierarchical diagram according to the present disclosure.

Reference numerals: substrate paper layer 1; BOPP optical film layer 2; UV-printing ink layer 3; central scoring area 31; outer scoring area 32; peripheral marking area 33; adhesive 4; unwinding end 5; winding end 6; printing assembly 7; UV ultraviolet lamp 8; corona treatment device 9; and machine master control screen 10.

DETAILED DESCRIPTION OF THE EMBODIMENTS

Embodiments of the present disclosure will be described in detail with reference to the accompanying drawings and examples hereinafter.

Figure 2:
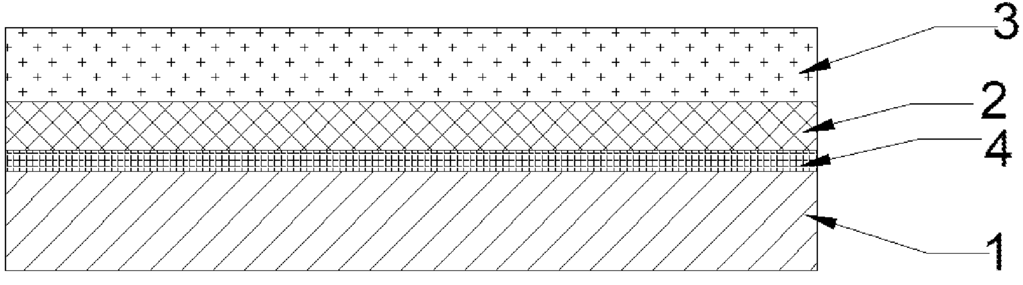
FIG. 2 is a schematic front view according to the present disclosure.
Figure 4:
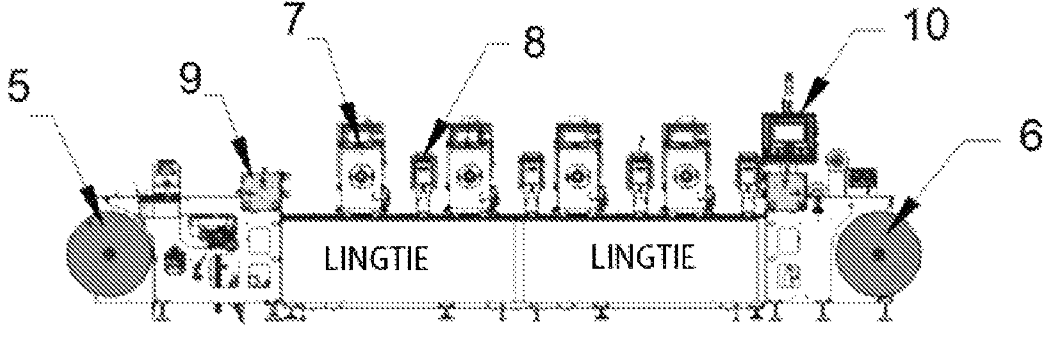
FIG. 4 is a schematic view of a UV-printing device according to the present disclosure.

Referring to FIGS. 1 to 4, the present disclosure provides a shooting color-changing target paper comprising a substrate paper layer 1, a BOPP optical film layer 2 and a UV-printing ink layer 3, wherein the BOPP optical film layer 2 is provided above the substrate paper layer 1, the UV-printing ink layer 3 is provided above the BOPP optical film layer 2, and the UV-printing ink layer 3 is provided with a central scoring area 31, an outer scoring area 32 and a peripheral marking area 33 according to the use requirements which are provided with a background color and a contour shape according to use requirements.

The shape outline of the scoring area of the target paper is selected according to the design requirements. The shape outline may be a geometric figure, and may also be a figure with obvious identification degree, such as animals and plants and buildings, to enrich the shooting experience.

The central scoring area 31, the outer scoring area 32, and the peripheral marking area 33 may be selected as a single color or a combination of colors with a variety of different degrees of distinction according to design to show different appearance forms and enrich the shooting experience.

BOPP films, i.e., biaxially oriented polypropylene films, are a very important flexible packaging material, which is colorless, odorless, tasteless, non-toxic and has high tensile strength, impact strength, rigidity, strength and toughness and good transparency.

BOPP films are produced by first forming a melt of high molecular weight polypropylene through a slit die into a sheet or thick film and then drawing toward two orthogonal directions (longitudinal direction, horizontal direction) simultaneously or in steps in a dedicated drawing machine at a certain temperature and set speed, with appropriate cooling or heat treatment or special processing (e.g., corona, coating, etc.).

The BOPP optical film layer 2 is adhesively provided on the substrate paper layer 1 by means of an adhesive 4.

UV-printing is a printing process in which an ink is dried and cured by ultraviolet light, and it is necessary to combine an ink containing a photosensitizer with a UV curing lamp.

According to the present application, special UV special-purpose inks of different colors are used to print different patterns on different areas of the target paper, and are combined to form a complete target paper pattern to be used.

Wherein, the substrate paper and BOPP optical film component materials are selected based on the application requirements of chemical substance detection in the country for product application to meet the requirements for healthy and environmentally friendly use without pollution.

Further, the substrate paper layer 1 is a dyed paper with a striking color, and the background color and pattern of the dyed paper are selectively set according to the use requirements. When a bullet or other object passes over the surface of the target paper, the surface UV ink is wiped off to expose a striking bottom material color.

Wherein, the dyed paper is dyed in a single color or in a plurality of color zones according to design requirements, and has different shooting demonstration effects. A single dyed substrate exhibits a single color, i.e., a monochrome spattering effect, and a plurality of color dyeing can exhibit different colors in different zones, i.e., a multi-color spattering effect.

The present application provides a process for producing a shooting color-changing target paper, comprising the following steps:

- S1: prepare a substrate as follows: dye and print the paper into a dyed paper with a striking color for subsequent use;
- S2: attach a BOPP optical film as follows: adhere and provide the BOPP optical film on the dyed paper with an adhesive;
- S3: place the substrate on a printing device as follows: wind and place the two ends of the substrate with the BOPP optical film prepared in step S2 on a winding assembly of the printing device, such that the substrate-dyed paper is located on a lower side of the printing assembly of the printing device;
- S4: print the target paper pattern as follows: start the printing assembly and the winding assembly of the printing device, such that the substrate-dyed paper moves from an unwinding end to a winding end of the winding assembly; print a UV-printing ink layer by the printing assembly using a UV special-purpose ink on the BOPP optical film layer; and set the printing pattern of the UV-printing ink layer according to the design and use requirements;
- S5: cure with a UV lamp as follows: turn on the UV ultraviolet lamp on the printing device; dry and cure the target paper pattern by the UV ultraviolet lamp; and wind up the finished product of the printed target paper by a winding section of the winding assembly; and S6: package the finished product as follows: cut the target paper roll cured in step S5 into a desired size and shape, and then package and warehouse the same.

Further, step S2 comprises:

step S201: unwinding and stretching the substrate-dyed paper to a desired size;

step S202: adhering the BOPP optical film to a surface of the substrate-dyed paper using a suitable glue or adhesive 4; and ensuring uniform bonding and avoiding bubbles and wrinkles;

step S203: subjecting the bonded material to heat and pressure treatment to ensure that the BOPP optical film is firmly bonded to the substrate-dyed paper and is flat.

Further, in step S3, a step S301 of a corona process is further comprised, wherein a corona device 9 is provided at the printing device near the unwinding end 5 of the winding assembly, and the substrate paper layer 1 to be printed is subjected to electric shock treatment by the corona device 9. “Corona treatment” is an electric shock treatment that imparts a higher adhesion to the surface of the substrate. Most plastic films (such as poly hydrocarbon films) are non-polar polymers, and the known inks and adhesives 4 with low surface tension cannot be firmly attached on them. Therefore, corona treatment should be performed on the surface of the plastic films to break the chemical bonds of the plastic molecules and degrade them, and a large amount of ozone will be generated during discharge. The ozone is a strong oxidizing agent which can oxidize the plastic molecules and generate stronger polar groups such as carbonyl and peroxide, thereby improving the surface energy.

Further, in step S4, the printing assembly 7 comprises a plurality of printing units containing UV special-purpose inks of different colors, which are sequentially provided on a moving path of the target paper in sequence. The master control system is provided with central scoring area 31, outer scoring area 32 and peripheral marking area 33 graphics of different colors according to use requirements, and the graphics of corresponding colors are sequentially printed on the corresponding areas of the target paper using the UV special-purpose inks by the printing units.

The UV-printing apparatus is provided with a multi-color printing unit, which is selectively turned on according to use requirements, and if subsequent colors do not need to be used, the corresponding printing unit can be turned off, and the subsequent UV ultraviolet lamp 8 can be turned on to continue UV light irradiation on the strip-shaped target paper product, further enhancing the drying and curing effects.

The master control system comprises a machine master control screen 10, and the operation and debugging of each component are controlled by a built-in control system.

Further, in step S5, a UV ultraviolet lamp 8 is provided at the rear of each printing unit, and after each printing, the target paper patterns of successively printed colors are dried and cured by the UV ultraviolet lamp 8 to ensure that the colors are not mixed.

Further, in step S5, a step S501 of a counting process is further comprised, wherein the printing device is provided with a visual detection device near the winding end 6 of the winding assembly, and the finished product is detected and counted by the visual detection device to ensure that the ink patterns of various colors relate to each other to form a complete target paper pattern of different colors. Color adjustments and corrections are made as necessary to achieve the desired color and pattern effects. The specific process parameters and equipment may vary according to the production scale and equipment model, and need to be adjusted and optimized according to the actual situation.

The present application has the following features:

The present application provides a shooting color-changing target paper from which the shooting and color-changing effects are obtained when a bullet hits the target paper pattern and rubs off the UV ink to expose the bottom color of the substrate (writing paper or dyed paper). The deficiencies of common target paper are thus overcome, such that the shooting training activities are more intuitive and interesting.

The product produced according to the present application is printed once without repeated multi-layer printing and multi-layer coating for bonding. The present application uses a UV lamp to dry and cure a special ink. This process may ensure that the ink is cured and attached to the BOPP light film, such that the ink has higher durability. The produced target paper can be immediately packaged and used without ventilation and drying. The production process of the present disclosure is simpler and more efficient than existing production processes for printing target paper.

Finally, it is noted that the above-mentioned embodiments are used for illustrating rather than limiting the technical solution of the present disclosure, although the present disclosure is described in detail with reference to better embodiments. Those skilled in the art should understand that modifications and equivalent replacement to the technical solution of the present disclosure may be made without departing from the spirit and scope thereof as defined by the appended claims.

Standard parts used in the present disclosure are all commercially available; the irregular parts may be customized according to what is specified in the Description and the drawings; the specific connection methods of each part are adopted by the conventional means such as bolts, rivets and welding which are mature in the prior art; the machinery, parts and devices are adopted by the conventional models in the prior art; and the circuit connection are adopted by the conventional connection methods in the prior art, all of which are not described in detail herein.

According to the present disclosure, unless explicitly stipulated and limited otherwise, the terms “mounted”, “coupled”, “connected”, “fixed” and the like are to be understood in a broad sense. For example, they may be fixedly connected or detachably connected, or integrated; may be a mechanical connection or an electrical connection; may be directly coupled or indirectly coupled through an intermediate medium, and may be the communication between two elements or the interaction relationship between two elements. The specific meaning of the above terms in the present disclosure can be understood in detail by those skilled in the art.

What is claimed is:

1. A process for producing a shooting color-changing target paper, wherein comprising the following steps:

S1: prepare a substrate as follows: dye a paper into a dyed paper with a striking-color for subsequent use;

S2: attach a BOPP optical film as follows: adhere the BOPP optical film on the dyed paper with an adhesive;

S3: place the BOPP optical film adhered to the substrate on a printing device as follows: wind two ends of the substrate with the BOPP optical film prepared in step S2 on a winding assembly of the printing device, such that the BOPP optical film adhered to the substrate is located on a lower side of a printing assembly of the printing device;

S4: print a target paper pattern as follows: start the printing assembly and the winding assembly of the printing device, such that the BOPP optical film adhered to the substrate moves from an unwinding end to a winding end of the winding assembly; set a printing pattern of a UV-printing ink layer according to design and use requirements; and print the UV-printing ink layer by the printing assembly using a UV special-purpose ink on the BOPP optical film;

S5: cure with a UV lamp as follows: turn on the UV lamp, which is part of the printing device; dry and cure the target paper pattern by the UV lamp to form a finished product of a printed target paper; and wind up the finished product of the printed target paper by a winding section of the winding assembly to form a roll of the printed target paper; and S6: package the finished product as follows: cut the roll of the printed target paper roll cured in step S5 into a desired size and shape, and then package and warehouse the same.

2. The process for producing a shooting color-changing target paper according to claim 1, wherein step S2 comprises:

step S201: unwinding and stretching the substrate to a desired size;

step S202: adhering the BOPP optical film to a surface of the substrate using a glue or adhesive; and ensuring uniform bonding and avoiding bubbles and wrinkles;

step S203: subjecting the BOPP optical film adhered to the substrate to heat and pressure treatment to ensure that the BOPP optical film is firmly bonded to the substrate and is flat.

3. The process for producing a shooting color-changing target paper according to claim 1, wherein in step S4, the printing assembly comprises a plurality of printing units containing UV special-purpose inks of different colors, which are sequentially provided on a moving path of the BOPP optical film adhered to the substrate; and a master control system that is provided with central scoring area, outer scoring area and peripheral marking area graphics of different colors according to the use requirements, and the graphics of different colors are sequentially printed on the corresponding areas of the BOPP optical film adhered to the substrate using the UV special-purpose inks by the printing units.

4. The process for producing a shooting color-changing target paper according to claim 3, wherein in step S5, a UV lamp is sequentially provided after each printing unit in the moving path, and after each printing, the target paper patterns of successively printed colors are dried and cured by the UV lamp to ensure that the colors are not mixed.

* * * * *